United States Patent
Calzada et al.

(10) Patent No.: US 8,555,777 B2
(45) Date of Patent: Oct. 15, 2013

(54) TWO-SURFACE GRILL WITH ADJUSTABLE GAP AND MULTI-STAGE METHOD FOR COOKING FOOD

(75) Inventors: Manuel Calzada, Rolling Meadows, IL (US); Paul G. Simmons, Glen Ellyn, IL (US); Jerry Sus, Frankfort, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 1397 days.

(21) Appl. No.: 11/243,154

(22) Filed: Oct. 4, 2005

(65) Prior Publication Data

US 2007/0077338 A1  Apr. 5, 2007

(51) Int. Cl.
*A47J 37/06* (2006.01)
*A47J 37/10* (2006.01)
*A22C 7/00* (2006.01)

(52) U.S. Cl.
USPC ......... 99/349; 99/350; 99/367; 99/372; 99/379; 99/385; 99/389; 99/422; 100/43; 100/44; 100/45; 100/46; 100/48; 100/49; 100/50; 426/233; 426/513; 426/523

(58) Field of Classification Search
CPC .............. A47J 37/0611; A47J 2037/0617
USPC .......... 99/349, 350, 367, 372, 379, 385, 389, 99/422; 100/43, 44, 45, 46, 48, 49, 50; 426/513, 523, 233, 326
See application file for complete search history.

(56) References Cited

U.S. PATENT DOCUMENTS

| | | | |
|---|---|---|---|
| 4,059,381 A * | 11/1977 | Schott, Jr. | 425/406 |
| 4,303,008 A * | 12/1981 | Hice et al. | 99/353 |
| 4,315,950 A * | 2/1982 | Reed | 426/509 |
| RE31,857 E * | 4/1985 | Holly | 426/513 |
| 5,168,880 A * | 12/1992 | Sogawa et al. | 607/102 |
| 5,522,308 A * | 6/1996 | Kayashima et al. | 99/331 |
| 5,552,172 A * | 9/1996 | Liebermann | 426/232 |
| 5,569,478 A | 10/1996 | Liebermann | |
| H1623 H * | 1/1997 | Reed et al. | 219/524 |
| 5,716,657 A * | 2/1998 | Liebermann | 426/232 |
| 5,755,150 A * | 5/1998 | Matsumoto et al. | 99/334 |
| 5,791,234 A * | 8/1998 | Newton et al. | 99/349 |
| 5,847,365 A * | 12/1998 | Harter et al. | 219/492 |
| 5,910,207 A * | 6/1999 | Newton et al. | 99/349 |
| 6,016,743 A * | 1/2000 | Glavan | 99/349 |
| 6,079,321 A * | 6/2000 | Harter et al. | 99/349 |
| 6,253,531 B1* | 7/2001 | Steele | 53/329.3 |
| 6,332,768 B1* | 12/2001 | Raio et al. | 425/152 |
| 6,439,108 B1 | 8/2002 | Wu | |
| 6,467,400 B2* | 10/2002 | Raio et al. | 99/349 |
| 2004/0018284 A1* | 1/2004 | Kuethe et al. | 426/326 |
| 2005/0000957 A1* | 1/2005 | Jones et al. | 219/450.1 |
| 2005/0072311 A1* | 4/2005 | Szymanski | 99/349 |
| 2005/0126476 A1* | 6/2005 | Shutic et al. | 118/308 |
| 2005/0193897 A1* | 9/2005 | Nevarez et al. | 99/349 |

* cited by examiner

*Primary Examiner* — Henry Yuen
*Assistant Examiner* — Brett Spurlock
(74) *Attorney, Agent, or Firm* — Ryndak & Suri LLP

(57) ABSTRACT

The present invention relates to a device and a method for cooking food on a grill having opposed upper and lower platens wherein a gap spacing between the platens is adjusted in an initial stage and in subsequent stages of the cooking time for the meat. The method includes causing the food to be located between two opposed platens, the opposed platens each having opposed cooking surfaces and the opposed cooking surfaces defining a gap spacing that is adjustable, and adjusting the gap spacing between the platens so that during an initial stage of the cooking the gap spacing is equal to or less than the nominal initial uncooked thickness of the food, and during one or more subsequent stages of the cooking, after the initial stage, the gap spacing between the platens is varied.

20 Claims, 4 Drawing Sheets

TWO-SURFACE GRILL WITH ADJUSTABLE GAP AND MULTI-STAGE METHOD FOR COOKING FOOD

FIELD OF THE INVENTION

The present invention relates to a device and a method for cooking food, and in particular meat, on a grill having opposed upper and lower platens wherein a gap spacing between the platens is adjusted in an initial stage and one or more subsequent stages of the cooking time for the food.

BACKGROUND

Numerous cooking devices are known in the art for cooking meat and other food products. One such device is a clamshell griddle or grill disclosed in U.S. Pat. Nos. 6,016,743, 5,910,207, 5,755,150, and 5,569,478, each of which is incorporated by reference herein. These clamshell grills are typically used in quick service restaurants to cook meat, for example, one or more hamburger patties, efficiently in a short amount of time between heated upper and lower cooking surfaces having a fixed gap spacing therebetween.

When cooking a plurality of meat items, conventional grills and methods do not account for differences in the thickness of each meat item due to the fixed gap spacing between the upper and lower cooking surfaces. Therefore, known grills and cooking methods may not uniformly cook the meat from item to item if there is any substantial variance in meat thickness from item to item.

Further, quick service restaurants may freeze their meat to maintain the freshness of the meat and to enable the meat to be used on an as-needed basis. It is well known, however, that known grills and grill cooking methods often sear or burn the surface of the meat during cooking due to the initial compression of the meat and the substantial temperature difference between the frozen meat and the heating surfaces. Further, due to the high temperature of the heating surfaces and the cooking time required to thaw and thereafter cook frozen meat thoroughly, known grills and cooking methods often cause the cooked meat to lose tenderness and a substantial amount of internal moisture.

Accordingly, there is a need for an improved device and method for cooking meat on a grill which improves the taste, texture, and mouthfeel of the cooked meat product and more uniformly cooks a plurality of food items, such as hamburger patties.

SUMMARY

In accordance with one aspect of the present invention, a method of cooking food such as meat having an initial uncooked thickness on a grill is provided. The method uses different compression levels determined by predetermined gap spacings to thaw and sear the meat items and to maintain the internal moisture and tenderness of the meat products. The method comprises: causing the meat, which is typically frozen meat, to be located between two opposed platens, the opposed platens each having opposed cooking surfaces, and the opposed cooking surfaces defining a gap spacing that is adjustable; adjusting the gap spacing between the platens so that during an initial stage of the cooking the gap spacing is less than the nominal initial uncooked thickness of the meat, and during a secondary stage of the cooking after the initial stage, the gap spacing between the platens is increased but is still less than the nominal initial uncooked thickness.

It will be appreciated that meat and other fresh, chilled and frozen food products will vary somewhat in thickness. Accordingly, the gap spacing is adjusted based on the nominal thickness of the type of food product to be cooked and not for each individual food item. Thus, reference herein to an initial thickness of the meat or other food product should be understood to refer to the nominal initial thickness of the type of food product to be cooked.

Typically, the meat product is a hamburger patty having a top and a bottom, and the step of causing the meat to be located between two opposed platens comprises orienting the hamburger patty so that the top and bottom of the hamburger patty oppose the platen cooking surfaces. The orienting of the hamburger patty as such is typically performed by closing one of the platens onto the opposed other of the platens in a clamshell-like fashion.

In accordance with another aspect of the present invention, the gap spacing during an initial stage of the cooking is in the range of from about 75% to about 90% of the initial thickness of the meat, and preferably is from about 83% to about 86% of the initial thickness of the meat.

In accordance with another aspect of the present invention, during a portion of the initial stage, the gap spacing is greater than the initial thickness of the meat.

In accordance with yet another aspect of the present invention, the gap spacing during a secondary stage of the cooking is in the range of from about 87% to about 97% of the initial meat thickness, and preferably is from about 88% to about 95% of the initial meat thickness.

In accordance with yet another aspect of the present invention, the gap spacing is greater than the thickness of the meat during a portion of the secondary stage.

In accordance with yet another aspect of the present invention, the meat product has a cooking time and the initial stage constitutes about 6% to about 13% of the cooking time and the second stage constitutes from about 87% to about 94% of the cooking time for the meat product.

In accordance with still another aspect of the present invention, the gap spacing is adjusted by applying a force of about 0.20 to 0.35 pounds per square inch of meat to one or more of the platens. The applied force is sufficient to substantially squeeze the meat and achieve a desired gap spacing during the initial stage.

In accordance with another aspect of the present invention, a grill is provided for cooking one or more meat products having an initial uncooked thickness. The grill includes at least one set of opposed upper and lower platens. Each of the opposed platens has a platen cooking surface mounted for movement toward and away from the other of the opposed platens for defining an adjustable gap spacing between the platen cooking surfaces. The grill further includes gap spacing adjustment means for controlling and changing the gap spacing between the platen cooking surfaces during the grilling of a meat item located between the platens so that during the grilling the gap spacing is less than the initial uncooked thickness of the meat, and during a secondary stage of the cooking, after the initial stage, the gap spacing between the platens is increased but is still less than the initial uncooked thickness.

In accordance with yet another aspect of the present invention, gap spacing adjustment means for controlling and adjusting the gap spacing between the platen cooking surfaces comprises a drive mechanism associated with at least one of the platens for moving the cooking surface of at least one of the platens towards and away from the cooking surface of the other of the opposed platens and to control and adjust the gap spacing between the cooking surfaces of the two platens.

In accordance with still another aspect of the present invention, the drive mechanism is capable of applying sufficient force to a plurality of frozen hamburger patties to reduce the thickness of the frozen hamburger patties by at least about 25% from the nominal initial thickness of the patties.

In accordance with yet another aspect of the present invention, the gap spacing adjustment means for controlling and adjusting the gap spacing between the platen cooking surfaces further comprises a microprocessor capable of controlling the drive mechanism. The microprocessor may be programmed to cause the drive mechanism to compress meat items located between the cooking surfaces of the platens during an initial cooking stage to a gap spacing ranging from about 75% to about 90% of the initial thickness of the meat item, and thereafter, during a secondary stage of the cooking, to increase the gap spacing between the platens to a range of from about 87% to about 97% of the initial thickness of the meat item.

In accordance with still another aspect of the present invention, the microprocessor is programmed to cause the drive mechanism to retain an initial stage gap spacing of about 75% to about 90% of the initial meat thickness for about 6% to about 13% of the total cooking time for the meat item, and thereafter to retain a secondary stage gap spacing of about 87% to about 97% of the initial meat thickness for about 87% to about 94% of the total cooking time.

In accordance with yet another aspect of the present invention, a grill is provided comprising: upper and lower opposed platens, each platen having a platen cooking surface mounted for movement towards and away from each other for defining an adjustable gap spacing between the platen cooking surfaces; and a drive mechanism associated with at least one of the platens for moving the cooking surface of at least one of the platens toward and away from the cooking surface of the other platen to control and adjust the gap spacing between the cooking surfaces of the two platens during the grilling of a meat product located between the platens so that during the grilling the gap spacing is less than the initial uncooked thickness of the meat, and during a secondary stage of the cooking, after the initial stage, the gap spacing between the platens is increased but is less than the initial uncooked thickness.

In accordance with another aspect of the present invention, the grill includes a microprocessor which is capable of controlling the drive mechanism. The microprocessor may be programmed to cause the drive mechanism to compress meat items located between the cooking surfaces of the platens during an initial cooking stage to about 75% to about 90% of the initial meat thickness, and thereafter, during a secondary stage of the cooking, to obtain a gap spacing between the cooking surfaces of the two platens that is in the range of from about 87% to about 97% of the initial thickness of the meat item.

In accordance with yet another aspect of the present invention, the microprocessor is programmed to cause the drive mechanism to retain an initial stage platen gap spacing of about 75% to about 90% of the initial meat thickness for about 6% to about 13% of the total cooking time, and thereafter to retain a secondary stage platen gap spacing of about 87% to about 97% of the initial meat thickness for about 87% to about 94% of the total cooking time.

In accordance with yet another aspect of the invention, the method includes more than two and preferably five stages. In at least one point in time in an initial thaw stage, the initial platen gap spacing is equal to the initial uncooked thickness of the meat. In at least one point in time in a second sear stage, the gap spacing is less than the initial uncooked thickness of the meat. In a third moisture release stage, the gap spacing is again equal to the initial uncooked thickness of the meat. In fourth and fifth cook stages, the gap spacing is less than the initial uncooked thickness of the meat.

In accordance with yet another aspect of the invention, in a five-stage method, the drive mechanism provides an initial gap spacing equal to the thickness of the meat for about 6% of the total cooking time during a first stage, a gap spacing of about 78% to 82% of the meat thickness for about 13% of the total cooking time during a second stage, a gap spacing about equal to the thickness of the meat for about 1% of the total cooking time during a third stage, a gap thickness of about 88 to 92% of the meat thickness for about 40% of the total cooking time during a fourth stage, and a gap spacing of about 91-93% of the meat thickness for about 40% of the total cooking time during a fifth stage.

Other advantages and features of the invention will become apparent from the following description and from reference to the drawings.

DETAILED DESCRIPTION

Figure 1:
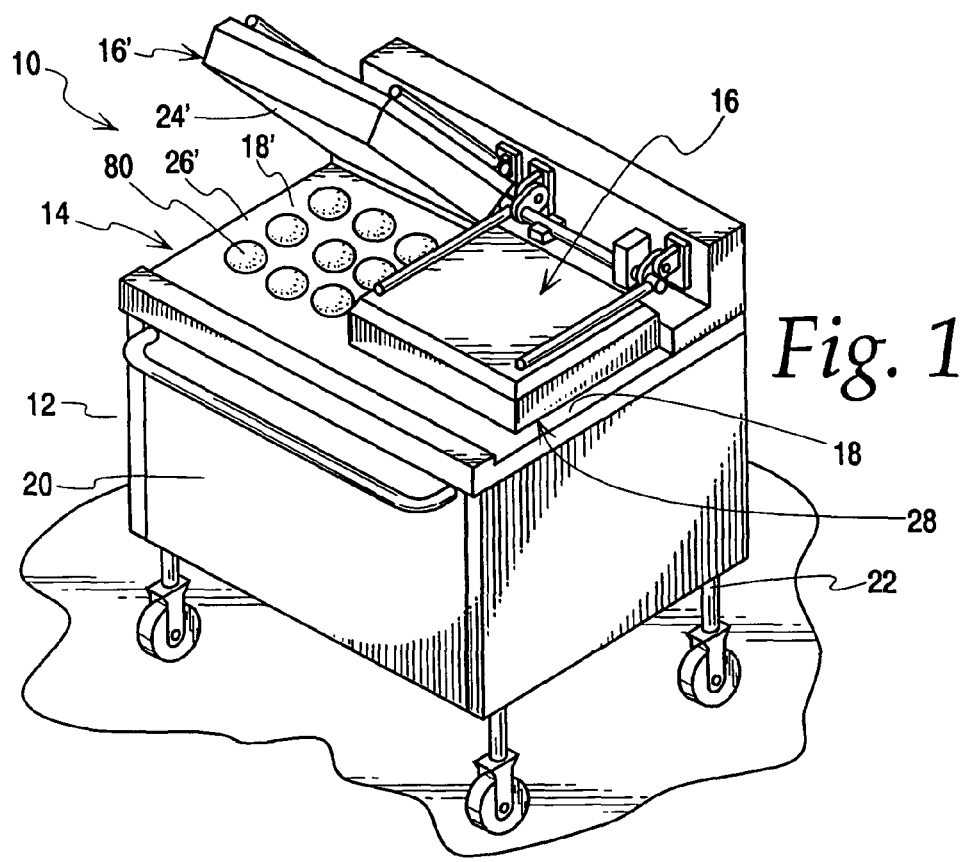
FIG. 1 is a perspective view of a cooking apparatus in accordance with the present invention.

While this invention is susceptible of embodiment in many different forms, there is shown in the drawings and described in detail herein, several specific embodiments with the understanding that the present disclosure is to be considered as exemplifications of the principles of the invention and is not intended to limit the invention to the embodiments illustrated.

Referring to the drawings and in particular to FIG. 1, clamshell grill 10 is shown as having a housing 12 and a griddle 14. Griddle 14 includes two spaced apart upper platens 16, 16' and two opposed spaced-apart lower platens 18, 18'. It is understood, however, that any number of opposed pairs of upper platens and lower platens may be utilized. Housing 12 comprises a body portion 20 having four leg members 22 with fixed casters such that grill 10 can be maintained in a stationary position in the kitchen of the restaurant in which grill 10 is located for example. Typically, housing 12 is constructed from stainless steel, such as chrome molybdenum steel, but may be formed from any other suitable material.

Each upper platen 16,16' includes an upper cooking surface 24,24' and each lower platen 18,18' of grill 10 includes a lower cooking surface 26,26'. When an opposed pair of platens are in a closed position 28, as shown by platens 16,18 in FIG. 1, opposed pair of platens 16,18 define an adjustable gap spacing 30 within which a meat item or a plurality of meat items may be cooked. Gap spacing 30 determines the level of compression of the meat items disposed therein. Platens 16,16',18,18' are typically formed from a heat-treated, polished, and "meat safe" material such as chrome molybdenum steel, but may be of any other suitable material.

Inside housing 12, a lower platen heating member 32, which may be a gas burner or an electric heater is arranged under lower platens 18,18' to supply heat thereto. Upper platens 16,16' typically include a body portion 34,34' having an electric heater (not shown) embedded within body portion 34,34'. Preferably, upper platens 16, 16' and the electric heater are of an aluminum casting heater type. Alternatively, any other suitable structure for providing heat to upper platens 16,16' and lower platens 18,18' may be used.

Figure 2:
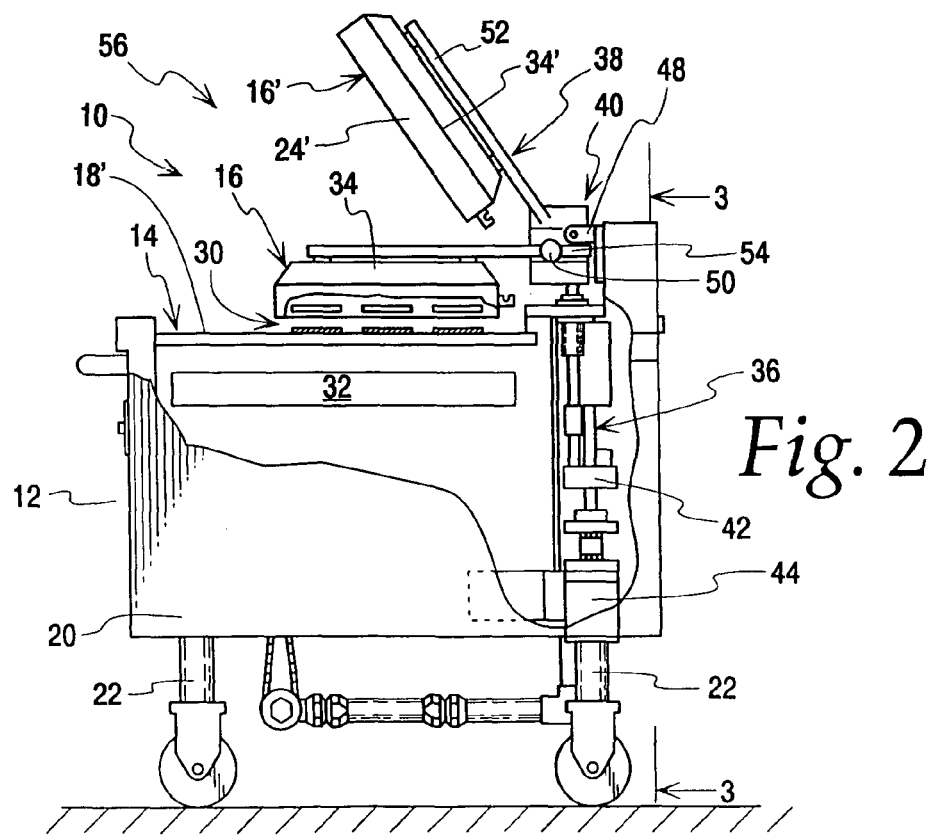
FIG. 2 is a side elevation view of the cooking apparatus of FIG. 1.

To adjust and maintain predetermined gap spacing 30 of grill 10, opposed upper and lower platens 16,16',18,18' are mounted for relative movement toward and away from each other. In one embodiment, as shown in FIG. 2, housing 12 includes a drive mechanism 36 and a microprocessor (not shown) to control drive mechanism 36. The microprocessor may be any suitable system known in the art for controlling the movement of any components of drive mechanism 36. Drive mechanism 36 is associated with at least one of platens 16,18 for moving one cooking surface 24, 26 of one of platens 16,18 towards and away from a cooking surface 24,26 of the other one of platens 16,18 Drive mechanism 36 thus controls and adjusts gap spacing 30 between the cooking surfaces of the two platens.

The microprocessor controls the drive mechanism 36 and thus the magnitude of gap spacing 30 throughout a predetermined cooking time for the meat product(s) on grill 10. The predetermined time typically includes two or more stages. In a two-stage embodiment of the invention, the predetermined time includes an initial cooking stage and a secondary cooking stage. In at least one point in time in the initial stage, one or both of an opposed upper platen 16 and a lower platen 18 are moved with respect to one another by drive mechanism 36 such that gap spacing 30 is less than the initial uncooked thickness of meat 80. In at least one point in time in the secondary stage of the cooking, drive mechanism 36 increases the gap spacing 30 between upper platen 16 and lower platen 18 to a gap spacing 30 which is greater than the smallest gap spacing in the initial stage.

In one embodiment, the microprocessor may be programmed to cause drive mechanism 36 to obtain a gap spacing 30 during the initial stage which is about 75% to about 90% of the initial meat thickness for about 6% to about 13% of the total cooking time. Further, the microprocessor may be programmed to cause drive mechanism 36 to obtain a gap spacing between the cooking surfaces of the two platens during the secondary stage of the cooking that is in the range of from about 87% to about 97% of the initial thickness of the meat item.

In a multi-stage embodiment of the invention, the predetermined time includes more than two and preferably five stages. In at least one point in time in an initial thaw stage, gap spacing 30 is equal to the initial uncooked thickness of the meat 80. In at least one point in time in a second sear stage, gap spacing 30 is less than the initial uncooked thickness of meat 80. In a third moisture release stage, gap spacing 30 is again equal to the initial uncooked thickness of meat 80. In fourth and fifth cook stages, the gap spacing 30 is less than the initial uncooked thickness of meat 80.

In one multi-stage embodiment, the microprocessor may be programmed to cause drive mechanism 36 to obtain a gap spacing 30 during the various stages which is approximately the percentage of the initial meat thickness shown in the following table, which also shows the approximate percentages of total cooking time represented by each stage:

TABLE 1

| Stage Sequence | Description | Compression (Percentage of Initial uncooked thickness) | Cooking Time |
| --- | --- | --- | --- |
| 1 | Thaw | 0% | 6% |
| 2 | Sear | 78%-82% | 13% |
| 3 | Moisture Release | 0% | 1% |
| 4 | Cook 1 | 88%-92% | 40% |
| 5 | Cook 2 | 91%-93% | 40% |

It is understood that drive mechanism 36 may create a predetermined gap spacing between each set of opposed upper and lower platens. Thus, the drive mechanism will operate until the opposed upper and lower platens have a predetermined value which is typically entered into an input for the microprocessor. In obtaining the predetermined gap spacing 30, drive mechanism 36 must exert a sufficient amount of pressure to render the gap spacing less than the thickness of the meat. In the present invention, drive mechanism 36 is capable, for example, of applying a sufficient force to a plurality of frozen hamburger patties 80 to reduce the thickness of the frozen hamburger patties by at least about 25% from their nominal initial thickness. It should also be understood that the pressure applied and the compression percentages shown in Table 1 are neither exact nor constant, as they will vary depending on the actual thickness of individual patties or other food items. The figures shown in Table 1 are based on a nominal initial thickness for a particular type of patty or other food item.

Figure 3:
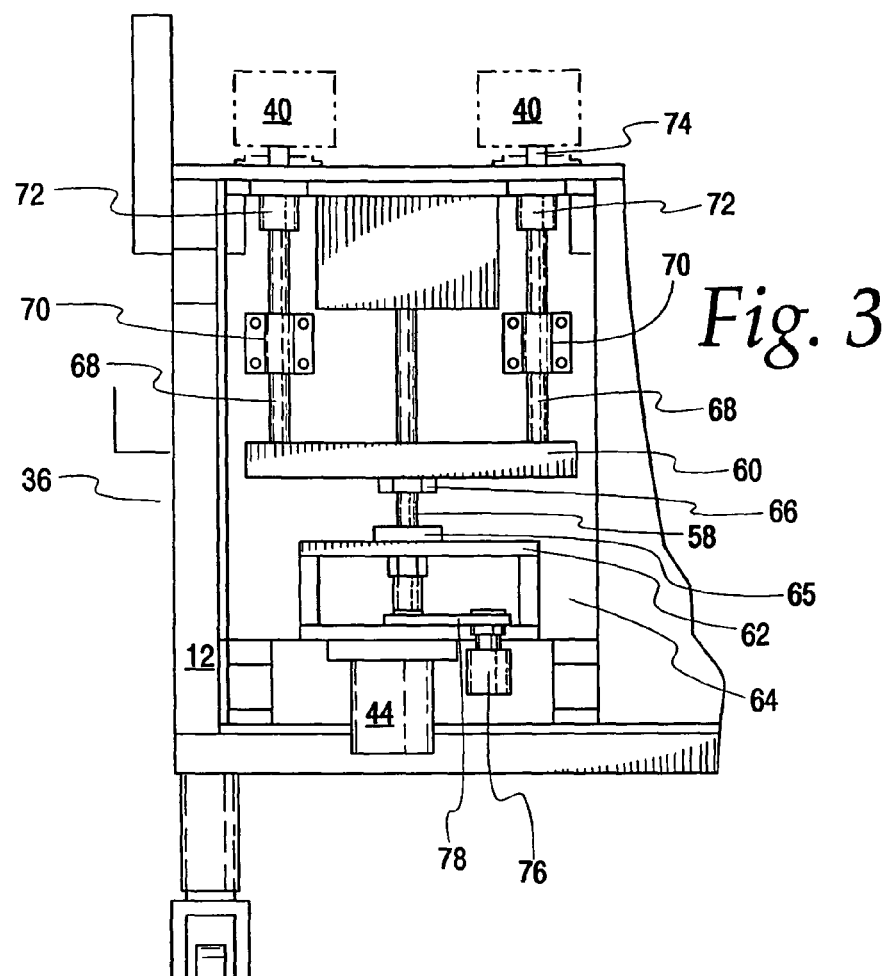
FIG. 3 is a rear elevation view taken at line 3-3 of FIG. 2.

In one embodiment, as shown in FIGS. 2-3 and described in U.S. Pat. No. 5,755,150 which is included by reference herein, drive mechanism 36 comprises an arm portion 38 and a bearing portion 40 which supports upper platen 16, a feed screw assembly 42, and a motor with a brake 44, a pair of cam rollers 46 which are rotatably attached to a pair of cam roller supports 48 on a corresponding position of arm portion 38, and a microprocessor (not shown).

Arm portion 38 comprises a shaft support portion 50 rotatably supported by bearing portion 40, a platen support 52 for supporting upper platen 16, and a cam operation portion 54 attached to a first and a second end of arm portion 38 for respectively placing shaft support portion 50 therebetween. Arm portion 38 is designed to rotate from a generally horizontal position, as shown by platens 16,18 in FIG. 4A, to an open position 56 as shown by platens 16',18' in FIG. 2. Additionally, bearing portion 40 and arm portion 38 are designed so as to not be rotated counterclockwise beyond closed position 28. After reaching the generally horizontal position, bearing portion 40 and arm portion 38 may move vertically downward or upward as desired to adjust gap spacing 30 while maintaining upper platen 16 parallel with lower platen 18.

Feed screw assembly 42 comprises a feed screw shaft 58 which extends vertically through a feed screw nut support 60 and a lower frame 62 disposed on a lower rear portion 64 of housing 12. Feed screw shaft 58 is designed so as to penetrate rotatably a feed screw support 65 attached to lower frame 62. Additionally, feed screw shaft 58 is adapted to be rotationally driven by motor 44, which is typically attached to lower frame 62. Additionally, feed screw assembly 42 comprises a feed screw nut 66 which engages feed screw shaft 58. Feed screw nut 66 is supported by feed screw nut support 60. Feed screw nut support 60 moves with feed screw nut 66 as feed screw nut 66 travels along feed screw shaft 58. Bearing portion support shafts 68 are installed respectively on both sides of feed screw nut support 60. Each bearing support shaft 68 is adapted to be moved vertically through a direct acting bearing 70 and a second direct acting bearing 72 as the feed screw nut support 60 moves.

A corresponding bearing portion 40 is connected to an upper end 74 of each bearing support shaft 68. As such, bearing portion 40 is moved up and down as bearing support shaft 68 moves up and down. A rotary encoder 76 is attached to the lower frame and is rotated by the revolution of motor 44 by a belt 78. Rotary encoder 76 generates an electric pulse in proportion to its rotation.

The microprocessor of grill 10 comprises a motor control circuit for controlling the motion of the motor 44, a counter for receiving and computing the electric pulse from rotary encoder 76, and a comparator circuit. Also, the microprocessor typically comprises a desired distance setting circuit for setting gap spacing 30 between upper platen 16 and lower platen 18. For example, in operation, the user may input a desired gap spacing value which represents the desired gap spacing 30 between an opposed upper platen 16 and lower platen 18 into the comparator circuit through the desired distance setting circuit by operating a position switch arranged on a lower operation panel of the housing 12.

In operation, to open the griddle from closed position 28 to an open position 56, the user may actuate a raise switch of an upper operation panel on clamshell grill 10. Thereafter, a command for opening one platen, and preferably upper platen 16 with respect to lower platen 18, is inputted into the motor control circuit. The motor control circuit, in response, actuates motor 44 to revolve in the designated direction. As the motor 44 revolves, feed screw shaft 58 is rotated in the designated direction and feed screw nut 66 engages with feed screw shaft 58 and moves in the designated direction, as in for example an upper direction. Consequently, feed screw nut support 60 and bearing portion support shafts 68 are also moved upward from a lower position.

As bearing portion support shafts 68 are moved upward, bearing portions 40 are also moved upward such that arm portion 38, supported by bearing portions 40, is also moved upward. Arm portion 38 thus holds and supports upper platen 16 and maintains upper platen 16 in generally horizontal position, relatively parallel to lower platen 18. While being moved upward, cam operation portion 54 of arm portion 38 begins to contact a corresponding cam roller 46 arranged on the back portion of the housing 12. Because the position of the cam roller 46 is fixed, a pressing force is applied to the cam operation portion 54 of arm portion 38 in a downward (clockwise) direction such that arm portion 38 is rotated clockwise around shaft portion 50, which is supported by bearing portion 40.

When arm portion 38 is rotated, a number of electric pulses proportional to the number of revolutions of motor 44 are added to the counter by rotary encoder 76. For example, an upper limit of the count value which corresponds to the travel of bearing portion 40 and upper platen 16 is set in the counter. The counter incrementally counts the electric pulses from rotary encoder 76. When the counter reaches the upper limit of the count value set previously, a command for stopping the motor is issued to the motor control circuit to stop the driving motion of motor 44. As a result, upper platen 16 is automatically stopped and held in the desired open position.

Thereafter, to move an opposed upper platen 16 and lower platen 18 into closed position 28, the user may input at least one desired gap spacing 30 suitable for the meat item or items to be cooked and the length of cooking time at the selected gap spacing into the microprocessor. Subsequently, any other gap spacing 30 and stage period may be inputted, such as for example a secondary stage of cooking as described herein.

To close upper platen 16 with respect to lower platen 18, a command is communicated to the motor control circuit. The motor control circuit rotatively drives motor 44 in the reverse direction of that discussed above. Consequently, feed screw shaft 58 is rotated in the reverse direction of that discussed above and feed screw nut 66 which engages feed screw shaft 58 is moved downward along feed screw shaft 58. As a result, bearing portion support shafts 68 also are moved downward from an upper position. As bearing portion support shafts 68 are moved downward, bearing portions 40 are also moved downward, and arm portion 38 supported by bearing portions 40 begins to be rotated, along with a corresponding upper platen 16 in a counterclockwise direction around shaft support portion 50.

The counterclockwise rotation of arm portion 38 is executed by the self-weight of upper platen 16 and is designed to be stopped at generally horizontal position where upper platen 16 is parallel to lower platen 18 with gap spacing 30 there between. When bearing portion support shafts 68 are moved down further after the upper platen 16 becomes parallel to lower platen 18, upper platen 16 is moved downward in the direction to reduce gap spacing 30 as desired while maintaining upper platen 16 in parallel relation to lower platen 18. Alternatively, gap spacing 30 may be increased by moving upper platen 16 and lower platen 18 further apart from one another.

While bearing portion support shafts 68 are moved down, the number of electric pulses proportional to the number of revolutions of the motor 44 is added to the counter by rotary encoder 76. The counter decrementally counts the electric pulses from rotary encoder 76. In particular, the counter decreases the number of electric pulses generated by rotary encoder 76 from the upper limit of the count value set previously. The counter outputs the current count value to the comparator circuit. The comparator circuit compares this count value with the gap spacing value set by the operator. When both values become equal, a motor stop command is issued to the motor control circuit to stop the driving of motor 44. Therefore, upper platen 16 is automatically stopped and held at the desired gap spacing 30. Gap spacing 30 between upper platen 16 and lower platen 18 at such time is equal to the desired value set by the operator.

A cook timer may specify a predetermined selectable cooking time for the meat product. Once the cooking time has passed, upper platen 16 can be automatically raised and rotated to be moved to open position 56, and the user is notified of the end of the cooking time by a buzzer alarm, or other suitable audio or visual alarm. Alternatively, the gap spacing can be further increased or decreased as desired. When the operator is notified that the cooking is finished, the cooked meat product can be removed from griddle 14. The distance between opposed upper platen 16 and lower platen 18 may be precisely and automatically set to an arbitrary value, for example, between 5 mm and 20 mm by selecting the appropriate relation between a screw pitch of the feed screw shaft 58 and the number of electric pulses generated by the rotary encoder 76.

It is understood that in the grill and method of the present invention, one of platens 16,16', 18,18' may be movable while an opposed one of platens 16,16',18,18' remains stationary. For example, as shown in FIG. 2, upper platen 16 is movable with respect to lower platen 18 which is stationary. Alternatively, lower platen 18 could move with respect to upper platen 16 or both upper platen 16 and lower platen 18 could move with respect to one another. It is critical only that the upper and lower platens 16,18 are directly opposed to one another when in a closed position 28 such that any meat item placed between platens 16,18 is not damaged between the platens.

Further, it is understood that the above description of a microprocessor and drive mechanism 36 constitute one embodiment of grill 10 in the present invention. Alternatively, any other microprocessor and drive mechanism 36 may be provided which is capable of adjusting a gap spacing between opposed upper and lower platens on a grill at a predetermined time.

Typically, meat is frozen when placed on lower cooking surfaces 26,26' of lower platens 18,18'. Meat may be any one of hamburger patties, sausage patties, vegetable burgers, steak items or the like, but are typically frozen hamburger patties 80. Hamburger patties 80 often come in two sizes: a ¼lb. burger having a pre-cooked weight of about 0.25 lbs. and ⅒lb. burgers having a pre-cooked weight of about 0.10 lbs. Generally, hamburger patties 80 are placed on lower cooking surfaces 26, 26' of lower platens 18, 18' in an array, as in a 3×3 array, as shown in FIG. 1, such that when platens 16,18 are moved into closed position 28, hamburger patties 80 are oriented such that a top and bottom surface of each hamburger patty 80 opposes the platen cooking surfaces. Once placed on lower platen 18, hamburger patties 80 are maintained between platens 16, 18 to cook the meat for a predetermined cooking time.

Figure 5:
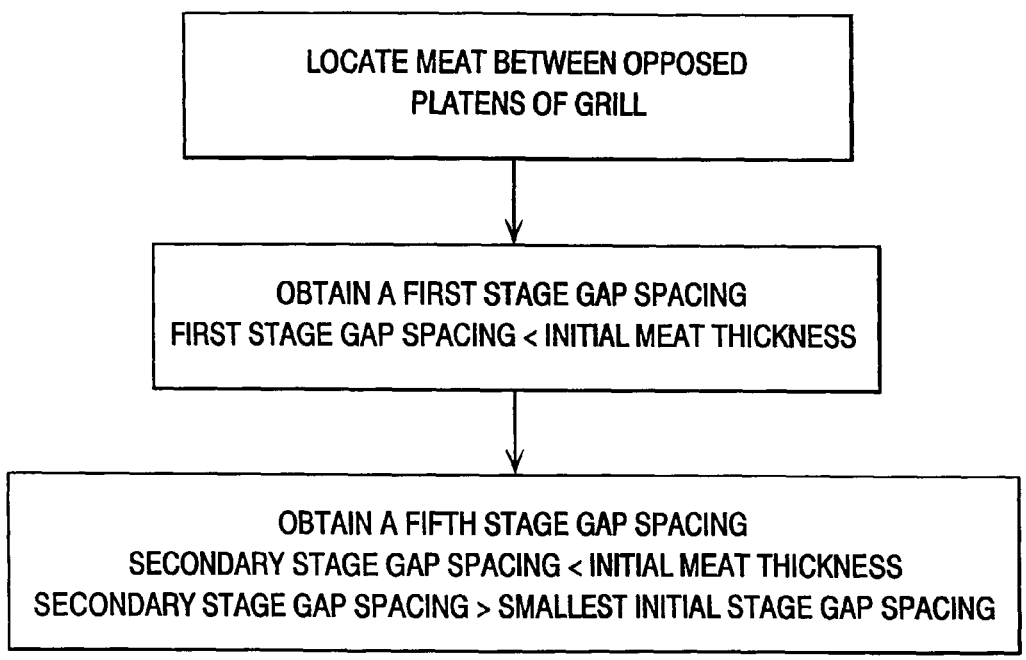
FIG. 5 is a flow diagram of a method of cooking meat items in accordance with a two-stage embodiment of the present invention.

FIG. 5 shows a flow diagram illustrating a two-stage method for cooking on a grill meat having an initial uncooked thickness in accordance with the present invention. The methods as will be described below may be performed on a grill of the type as described herein or any other grill having two opposed cooking surfaces may be modified to practice the invention. Other suitable grills include but are not limited to those devices disclosed by U.S. Pat. Nos. 6,016,743, 5,910,207, 5,755,150, and 5,569,478, each of which are incorporated by reference herein.

Initially, the meat, which is typically frozen meat, is located between two opposed platens 16, 18, the opposed platens each having opposed cooking surfaces 24, 26 and the opposed cooking surfaces 24, 26 define an adjustable gap spacing 30. Gap spacing 30 between platens 16,18 is adjusted so that during an initial stage of the cooking, the gap spacing is less than the initial uncooked thickness of the meat, and during a secondary stage of the cooking after the initial stage, the gap spacing 30 between the platens 16,18 is increased but is still less than the initial uncooked thickness of the next item. The particular magnitude of each gap spacing during the cooking of the meat will be further discussed in detail below. Typically, the temperature of upper platens 16,16' are set to about 425° F. and the temperature of lower platens 18,18' are set to about 355° F.

The present invention enables a number of meat products to be thoroughly and uniformly cooked on a clamshell grill or the like within a predetermined cooking time. The predetermined cooking time comprises at least the initial stage and the secondary stage. In at least one point in time in the initial stage, one or both of opposed upper platens 16, 16' and lower platens 18, 18' are moved with respect to one another such that the gap spacing 30 therebetween is less than the initial uncooked thickness of the meat. In at least one point in time in the secondary stage, one or both of opposed upper platens 16, 16' and lower platens 18, 18' are moved with respect to one another such that the gap spacing 30 therebetween is less than the initial uncooked thickness of the meat and is greater than the smallest gap spacing in the initial stage.

Figure 4A:
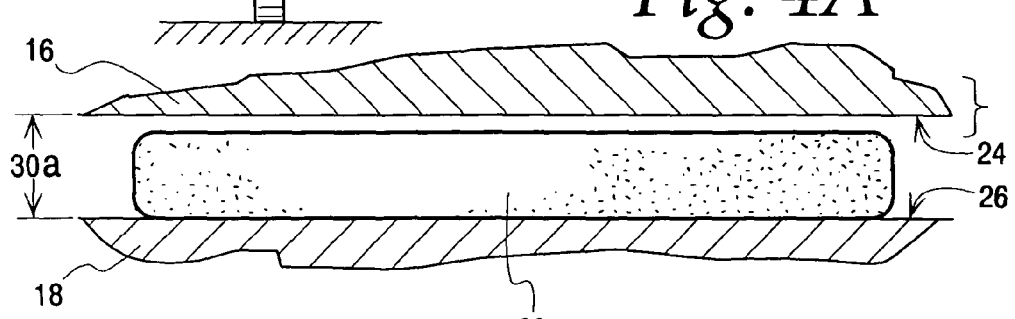
FIG. 4A is a fragmentary front elevation view of a hamburger patty located between two opposed platens, wherein the gap spacing is greater than the thickness of a hamburger patty.

FIG. 4A illustrates a hamburger patty 80 placed between an opposed upper platen 16 and a lower platen 18, wherein FIG. 4A upper platen 16 is being caused to lower with respect to lower platen 18, such as by drive mechanism 36 as described herein. As shown in FIG. 4A, upper platen 16 has yet to come into contact with hamburger patty 80, thus the height of gap spacing 30a is still greater than the initial thickness of the hamburger patty 80. As is also shown by FIG. 4A, upper platen 16 is maintained in a generally horizontal position relative to lower platen 18, thus upper platen 16 may be lowered with respect to lower platen 18 while being maintained in direct opposition to lower platen 18.

Figure 4B:
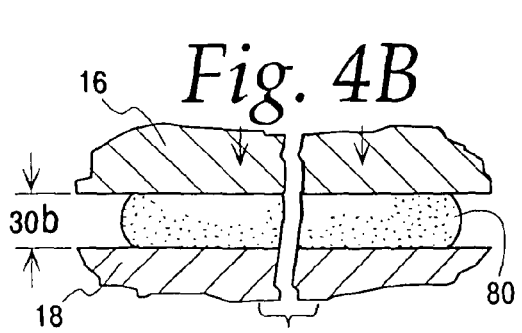
FIG. 4B is a fragmentary front elevation view of the hamburger patty located between opposed platens at a point in time in the initial stage of cooking.

FIG. 4B illustrates a hamburger patty at a point in time of the initial stage of its cooking period. As shown in FIG. 4B, during the initial stage, an opposed upper platen 16 and lower platen 18 have a gap spacing 30b which is less than the thickness of hamburger patty 80. Preferably, gap spacing 30b during the initial stage is in the range of from about 75 to 90% of the initial thickness of the meat, and more preferably is from about 83 to 86% of the initial thickness of the meat.

It is understood that hamburger patty 80 must have the gap spacing 30b, shown in FIG. 4B at least for some period of time, however long or short, at some point of time in the initial stage. However, the initial stage may include other additional time periods or stages wherein the gap spacing is different from that shown in FIG. 4B. For example, the initial stage may be characterized by an initial cooking period where the upper and lower platens 16, 18 contact top and bottom of hamburger patty 80 respectively to pre-heat hamburger patty 80, but the gap spacing is greater than that shown in FIG. 4B. Thus, there could be another stage which precedes the initial stage where the meat is pre-heated. In another embodiment, the gap spacing (not shown) may be greater than the thickness of the meat at a point of time of the initial stage.

The duration of the initial stage may be from 0-100% of the predetermined cooking time of the meat product. In one embodiment, the total cooking time for meat, such as hamburger patties, for the initial stage is about 6% to about 13% of the cooking time for the meat product. It is contemplated, however, that if the meat items were cooked in this initial stage for the entire duration of the cooking time, the meat would likely sear on a top or bottom surface due to the initial and substantial temperature difference between the cooking surfaces and the meat items, and the meat items may become relatively dry during the cooking.

By subjecting the meat items to at least one secondary stage wherein gap spacing 30b is relaxed, the meat is allowed to expand from its compressed state. In this way, the cooked meat items are evenly cooked throughout, contain their desired moisture and texture, and do not have the typical searing of the once-frozen meat. The secondary stage typically occurs after the initial stage, and is more particularly illustrated by FIG. 4C. In at least one point in time in the secondary stage, upper platen 16 and lower platen 18 have a gap spacing 30c which is greater than the smallest gap spacing 30b of the initial stage. Gap spacing 30c in the secondary stage at this point in time is still less than the initial uncooked thickness of hamburger patty 80. However, it is clear that in the secondary stage, gap spacing 30c is relaxed such that the meat can expand and may be cooked uniformly without substantial dehydration of the meat or searing of the meat. In a preferred embodiment, gap spacing 30c during the secondary stage is in the range of from about 87% to 97% of the initial meat thickness, and more preferably in the range of from about 88% to about 95%

Figure 4C:
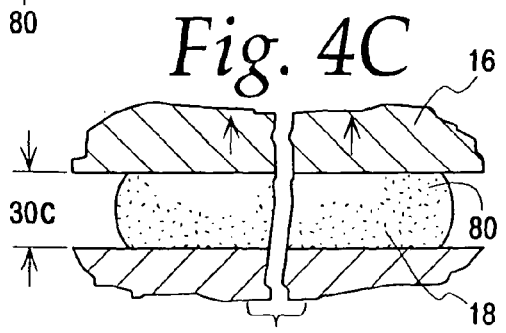
FIG. 4C is a fragmentary front elevation view of a hamburger patty located between opposed platens at a point in time in the secondary stage of cooking.

It is understood that the hamburger patty must be cooked with the gap spacing 30c, shown in FIG. 4C, at least for some period of time, however long or short, in the secondary stage. However, the secondary stage may have other time periods wherein the gap spacing is different from that shown in FIG. 4C. For example, the secondary stage may be characterized by a period where the upper and lower platens have a gap spacing (not shown) which is greater than the thickness of the meat at another point of time of the secondary stage. Further, the secondary stage may be characterized by a relaxing of the gap spacing at any point in time with the secondary stage.

The duration of the secondary stage may be from 0-100% of the predetermined cooking time of the meat product. In a preferred embodiment, the total cooking time for meat, such as frozen hamburger patties, for the secondary stage constitutes about 87% to about 94% of the cooking time for the meat product.

Further, as shown in FIGS. 4A-C and FIG. 5, in a preferred embodiment, hamburger patties 80 are subjected to cooking in the initial stage, and thereafter the secondary stage in sequential stages. However, the predetermined cooking time may alternatively comprise multiple stages. For example, the meat could be subjected to an initial stage, a secondary stage, returned to the initial stage, and thereafter cooked in a secondary stage. The number of stages is not limited by the present invention.

Figure 6:
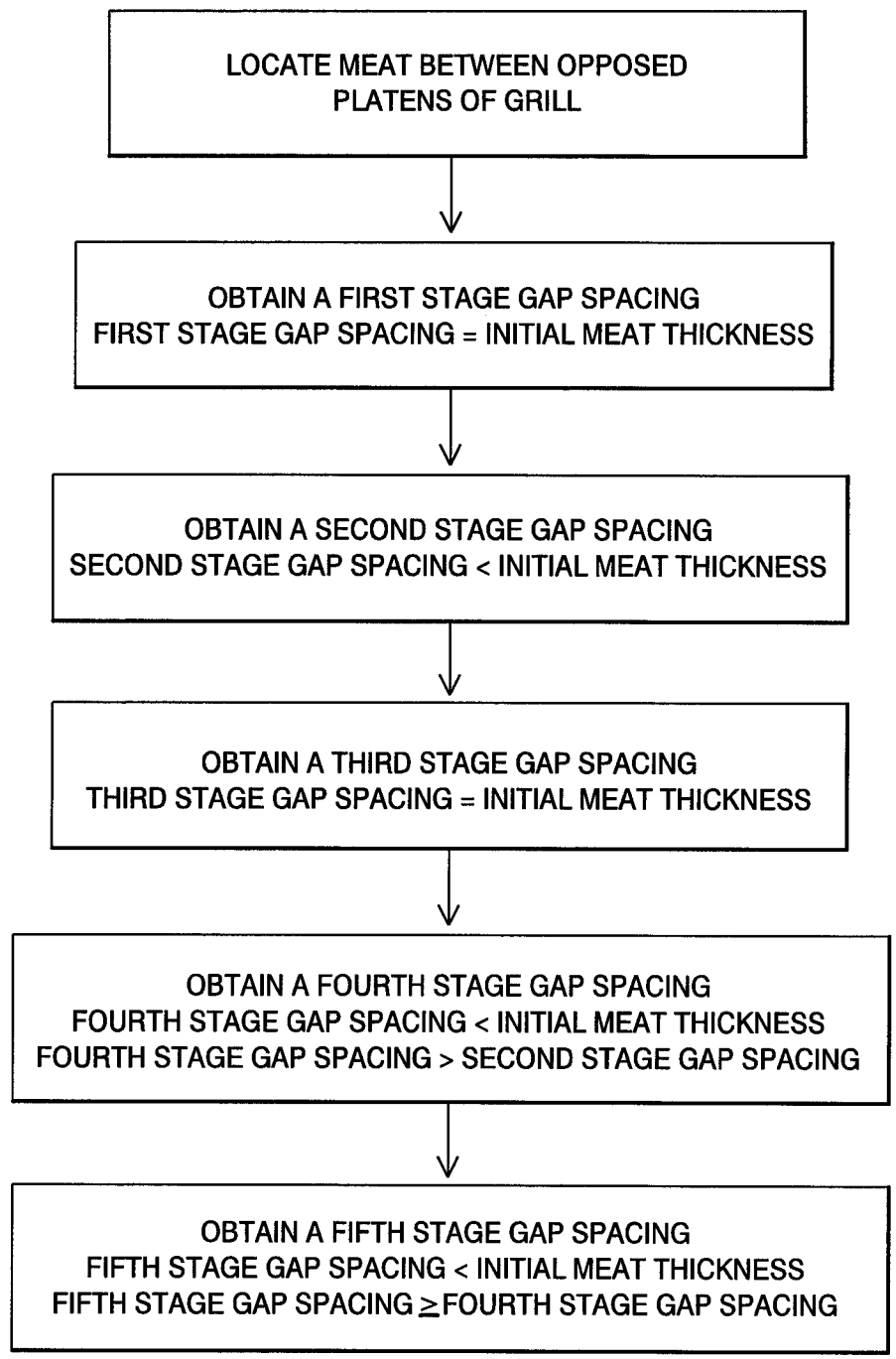
FIG. 6 is a flow diagram of a method of cooking meat items in accordance with a five-stage embodiment of the present invention.

For example, FIG. 6 shows a flow diagram illustrating a five-stage method for cooking meat on a grill. The method may be performed on a grill of the type described herein, or any other grill having two opposed cooking surfaces may be modified to practice the invention. The stages are characterized by the gap spacing and resulting compression of the meat as well as the preferred cooking times set forth above in Table 1. The combination of gap spacings and cooking times in the stages shown in Table 1 have been found to be particularly advantageous for cooking frozen hamburger patties (with cooking surface temperatures as described herein) to obtain consistent, uniform cooking without dehydration. Of course, the number of stages and the gap spacing and duration of each stage may be adjusted for different types of meat or other food products.

While the invention has been described with respect to certain preferred embodiments, it is to be understood that the invention is capable of numerous changes, modifications, and rearrangements without departing from the scope or spirit of the invention as defined in the claims.

The invention claimed is:

1. A method of cooking a food product having a nominal initial uncooked thickness on a grill having first and second opposable platens, each platen having an opposable cooking surface, comprising:

placing the food product on the first platen cooking surface, moving at least one of the platens so that the platen cooking surfaces are in an opposed relationship, the opposed cooking surfaces defining a gap spacing therebetween that is controllable and adjustable;

communicating commands from a programmable controller to a drive mechanism operatively associated with at least one of the platens; and controlling and adjusting the gap spacing by the drive mechanism in response to the commands by moving the at least one platen with respect to the other platen to predetermined gap spacings stored in the programmable controller, so that during an initial stage of the cooking the gap spacing is less than the nominal initial uncooked thickness of the food product and during a secondary stage of the cooking, after the initial stage of the cooking, the gap spacing between the platens is increased but is still less than the nominal initial uncooked thickness of the food product.

2. The method of claim 1 wherein the food product is a hamburger patty having a top and a bottom and said placing the food product and moving at least one of the platens orients the hamburger patty so that the top and bottom of the hamburger patty oppose the respective opposed platen cooking surfaces.

3. The method of claim 1 wherein the gap spacing during said initial stage of the cooking is in the range of from about 75% to about 90% of the nominal initial thickness of the food product.

4. The method of claim 1 wherein the gap spacing during said initial stage of the cooking is from about 83% to about 86% of the nominal initial thickness of the food product.

5. The method of claim 1 wherein the gap spacing during the secondary stage of the cooking is in the range of from about 87% to about 97% of the nominal initial thickness of the food product.

6. The method of claim 5 wherein the gap spacing during the secondary stage of the cooking is in the range of from about 88% to about 95% of the nominal initial thickness of the food product.

7. The method of claim 1 wherein the food product is frozen when placed on the first platen cooking surface.

8. The method of claim 1 wherein the food product has a cooking time and the initial stage constitutes about 6% to about 13% of the cooking time for the food product.

9. The method of claim 1 wherein the food product has a cooking time and the secondary stage constitutes from about 87% to about 94% of the cooking time for the food product.

10. The method of claim 1 wherein during a portion of the initial stage the gap spacing is increased so that it is greater than the nominal initial thickness of the food product.

11. The method of claim 1 wherein during a portion of the secondary stage the gap spacing is increased so that it is greater than the nominal initial thickness of the food product.

12. The method of claim 1 wherein the gap spacing is adjusted by applying a force to one or more of the platens sufficient to squeeze the food product and achieve the gap spacing during the initial stage.

13. The method of claim 12 wherein the force required is in the range of about 0.20 to 0.35 pounds per square inch of food product.

14. The method of claim 1 wherein the temperature of one of the cooking surfaces is approximately 335° F. and the temperature of the other one of the cooking surfaces is approximately 425° F.

15. A method of cooking in a plurality of stages a food product having a nominal initial uncooked thickness on a grill having first and second opposable platens, each platen having an opposable cooking surface, comprising:

placing the food product on the first cooking surface;

moving at least one of the platens so that the platen cooking surfaces are in an opposed relationship, the opposed cooking surfaces defining a gap spacing that is controllable and adjustable;

storing in a programmable controller a cooking program including predetermined gap spacings selected based on the nominal initial uncooked thickness of the food product;

communicating commands generated by the cooking program from the programmable controller to a drive mechanism operatively associated with at least one of the platens; and controlling and adjusting the gap spacing by the drive mechanism in response to the commands by moving the at least one platen with respect to the other platen to the predetermined gap spacings so that during at least one stage of the cooking the gap spacing is less than the nominal initial uncooked thickness of the food product and during at least one subsequent stage of the cooking, the gap spacing is increased so that it is greater than the smallest gap spacing in the initial stage but is still less than the nominal initial uncooked thickness of the food product.

16. The method of claim 15 wherein the temperature of one of the opposed platens is about 335° F. and the temperature of the other of the opposed platens is about 425° F. during all of the stages.

17. A five-stage method of cooking meat having a nominal initial uncooked thickness on a grill having first and second opposable platens, each platen having an opposable cooking surface, comprising:

placing the meat on the first cooking surface;

moving at least one of the platens so that the platen cooking surfaces are in an opposed relationship, the opposed cooking surfaces defining a gap spacing therebetween that is controllable and adjustable;

storing in a programmable controller a cooking program including pre-determined gap spacings for each of the five cooking stages; and communicating commands from the programmable controller to a drive mechanism operatively associated with at least one of the platens to control and adjust the gap spacing to the predetermined gap spacings by moving the cooking surface of said at least one of the platens relative to the other platen so that during a first stage of cooking the gap spacing is approximately equal to the nominal initial uncooked thickness of the meat, during a second stage of the cooking the gap spacing is less than the nominal initial uncooked thickness of the meat, during a third stage of the cooking the gap spacing is approximately equal to the nominal initial uncooked thickness of the meat, during a fourth stage of the cooking the gap spacing is less than the nominal initial uncooked thickness of the meat, and during a fifth stage of the cooking the gap spacing is less than the nominal initial uncooked thickness of the meat.

18. The method of claim 17 wherein the gap spacing during the second stage is from about 78% to 82%, during the fourth stage is from about 88% to 92%, and during the fifth stage is from about 91% to 93%, respectively, of the nominal initial uncooked thickness of the meat.

19. The method of claim 17 wherein the meat product has a cooking time and the first stage constitutes about 6%, the second stage about 13%, the third stage about 1%, the fourth stage about 40% and the fifth stage about 40%, respectively, of the cooking time.

20. The method of claim 17 wherein the temperature of one of the opposed platens is about 335° F. and the temperature of the other of the opposed platens is about 425° F. during all of the stages.

* * * * *